324-77 CROSS REFERENCE SEARCH ROOM

INVENTOR.
WILLIAM C. DERSCH
BY
John J. McCormack
ATTORNEY

March 1, 1966 W. C. DERSCH 3,238,303

WAVE ANALYZING SYSTEM

Filed Sept. 11, 1962 3 Sheets-Sheet 2

3,238,303
WAVE ANALYZING SYSTEM

William C. Dersch, Los Gatos, Calif., assignor to International Business Machines Corporation, New York, N.Y., a corporation of New York Filed Sept. 11, 1962, Ser. No. 222,819
19 Claims. (Cl. 179—1)

This invention relates to systems for the analysis of electrical waves and, more particularly, to a system for discriminating speech characteristics according to the properties of the transduced electrical wave.

The speech recognition art presents practical problems. Complicating the ever-present problem of accurate identification is the challenge of operating with the use of economically feasible means without the need for an elaborate array of components. I have resolved much of this complexity by reducing the detecting means necessary to identify the spoken word from the order of a few hundred active elements to essentially four. These four function to identify the speech elements of voicing, strong friction and weak friction. Voicing sounds are defined here as sounds which originate from vibrations of the vocal cords in response to the passage of air through them. This is not equivalent to "voicing" in musical terminology, where the term is concerned primarily with tonality. Voicing has particular characteristics which are carried into the resultant electrical signals and may be distinguished by circuits used in the systems and methods here described. One of these characteristics is a waveform which has asymmetric features. Voiced utterances give rise to electrical signals which have power peaks that are asymmetrically distributed relative to their reference axis, as contrasted to a sine wave, for instance, wherein the power peaks are symmetrically distributed about the "reference" or "zero-power" axis. Further, the wave has a complex character and may be considered to be periodic during the creation of a voiced sound.

Other sounds representing speech may be classified as frictional (or fricative) sounds. The frictional sounds result when the tongue, teeth or lips are formed into a constriction through which air is passed. The frictional sounds may further be subdivided into the strong frictional sounds, such as the "s," hard "t" and "x" sounds, and the weak frictional sounds, such as the "f," "v" and soft "t" sounds.

Detection in accordance with this invention is further simplified by the reduction of required discriminating systems from what might normally be three, namely, one for each of these parameters, to essentially one single system. This single identifying system, embodied in the instant invention, is a speech recognition device which can usefully accomplish a fourfold discrimination function by distinguishing between voicing, strong frictioning, and weak frictioning sounds, while rejecting common ambient noise. This device can also specifically detect the presence of mixed voicing-friction as well as noise. The basic parameter detected is the reference axis crossings of a transduced acoustic wave.

One way of detecting the difference between frictional and voiced sounds is according to the difference in the reference-axis crossing densities of the sounds when transduced into electrical waves; the identifying parameter being that the zero-axis-crossing density of a voiced sound is far less than that of a frictional sound. Consequently, if one can detect the zero-axis-crossing density of an acoustic wave, he may thereby discriminate between spoken syllables.

Another way of identifying a speech wave is that of separating weak frictioning sounds from strong frictioning sounds. These acoustic signals differ in acoustic energy. Consequently, it is useful in the speech recognition arts to provide a machine for detecting both the zero-axis-crossing density and the energy volume, or decibel level, of a sound. One may thereby identify speech according to the occurrence of the properties characterized above, namely, voicing, weak frictioning and strong frictioning sounds. My invention does this in addition to measuring crossing densities.

The instant invention performs this triple identification in a manner which has both accuracy and a minimum number of components. The invention involves using a bi-level impedance means to generate a pulse for each axis crossing (polarity reversal) and adding a second, higher trigger-level impedance in parallel for amplitude discrimination.

A more general application of this parallel connected-bilevel impedance measurement is the discrimination of any kind of electrical pulses according to their zero-axis-crossing densities and amplitude differences above a given density reference level. One implementation of this concept would be for the detection of photoelectric signals. One signal pulse could be presented for each light source detected, the pulse dropping below "reference amplitude" between glowings. The present invention would reject such signals below a given minimum number of light sources (zero-axis-crossing density) and also segregate signals above the reference density level according to their amplitude.

The advantages of the invention are illustrated by considering the drawbacks in the prior art. For example, prior art speech recognition systems will not handle a power peak range variation of about 3600:1. Furthermore, the high amplitude signal characteristic of the "a" sound in the word "eight" has a high degree of polarity asymmetry. Unlike many very complex axis-density circuits attempted heretofore, the present invention measures true axis density in simple fashion and is able to cope with a wide signal fluctuation for different speakers. Particularly troublesome is the "zero base line" drift due to large, and sometimes asymmetrical, signals that might immediately precede the axis density measurement for a weak signal. It is only when a circuit, in the sense of engineering approximations, has no "base line" drift, either static or dynamic, that the full potential of this invention becomes apparent. Tunnel diode arrangements have been chosen as apt for this function since, besides being extremely simple and economical, they exhibit an excellent degree of repeatability and dynamic stability. The quality of signal separation these diodes permit the inventive circuit to achieve an axis density discrimination heretofore impossible.

In addition, it has been found that the ambient noise of an ordinary room has been confused with the frictional speech sounds in the prior art. The circuit of this invention shows no perceptible response to such noise and will respond perfectly to a spoken frictional sound despite the presence of an "irksome" volume of noise. This accentuates the advantage of the invention in noisy environments such as a crowded office with the usual clatter of typing, buzzers, etc.

The second discriminating function, that of separating strong frictioning from weak frictioning, is accomplished by amplitude discrimination of pulses above the minimum frictional-level of zero-axis crossing density. This measurement is based upon my observation that such speech discrimination is possible simply according to the difference in "ratios" of axis crossing densities to signal amplitudes. These amplitude differences are detected by feeding speech signals into parallel lines of Esaki diodes so that the "transition current" level of one diode will respond to weak or strong frictioning, while that of the other responds to strong frictioning current only. In this fashion, only a weak frictioning signal is switched through to the output upon the incidence of weak frictioning while both signals are fed out in the case of strong frictioning, the difference in output signals representing the desired discrimination.

In this speech recognition context, the instant invention solves problems employing techniques hitherto unknown and with a simplicity impossible and unachieved in the prior art. Prior art techniques for recognizing the spoken word have taken the form of elaborate speech-pattern matching systems, as exemplified by the patent, 2,575,910, to Mathes. The concept of distinguishing spoken sounds according to their voicing, weak frictioning and strong frictioning content and of identifying these parameters, in turn, according to the measurement of the ratio of the zero-axis-crossing density to amplitude is not practically possible in the prior art. As opposed to the cumbersome complexity of the prior art noted above, I have devised a system requiring only a few diodes, switches and impedances to accomplish speech recognition with "nearly perfect" accuracy when used in the context of moderate-vocabulary machines.

Furthermore, the concept of analyzing waveforms according to their zero-axis-crossing density and detecting this by "bucking Esaki diode" and switch lines is a further new and useful improvement over prior art wave analysis means.

While the prior art has circumspectly considered this voicing-frictional tool for analyzing speech, it has not recognized that this parameter may be detected according to zero-crossing density and amplitude-ratio measurements of the transduced speech wave. It, furthermore, fails to teach the instant novel and simple mode of detecting wave characteristics using the bucking-Esaki diode techniques (e.g., polarity discrimination). Further, it fails to teach the importance of reducing base line drift to an absolute minimum as disclosed herein. Hence, the instant invention teaches a new speech analysis parameter; it shows a novel wave-analysis technique to detect this parameter and implements this technique by a novel system using simply a few diodes in combination with a few other conventional components.

Accordingly, it is an object of the present invention to separate weak frictioning-strong frictioning and voicing characteristics of a speech wave according to zero-axis-crossing and amplitude-ratio density measurements.

It is a further object to analyze wave characteristics according to the zero-axis-density parameter by using solid state pulse generators in tandem with bucking switch means.

A further object is to distinguish speech characteristics using tunnel diodes for detecting differences in pulse amplitude, according to differences in the transition current level of the diodes.

Another object is to distinguish weak frictioning from strong frictioning in speech according to signal amplitude by separately detecting these parameters and bucking the output from one detector against the other to yield a summed output characteristic of each parameter.

A further object is to separate weak frictioning from strong frictioning according to differences in the current level of the transduced wave, which levels are distinguished by separately detecting them according to the differences in transition currents of bi-stable, square hysteresis solid state devices and bucking the output of said devices against each other.

Yet another object is to analyze speech according to strong frictioning and weak frictioning parameters by the use, simply, of parallel lines of tunnel diode impedances, whose bi-stable responses can effectively distinguish them.

A still further object is to provide a means for separating frictioning and voicing speech components by the use simply of a pair of bi-stable diodes, each feeding a switching means.

Yet another object is to analyze speech by variations in output signal polarity in a circuit which, using a few components, requires only a single low voltage source.

Still another object is to provide a system for distinguishing the speech parameters of voicing strong frictioning and weak frictioning from undesirable noise using only a tunnel diode, a frictioning-voicing detector, a speech detector and a pair of binary pulse generators.

The foregoing and other objects, features and advantages of the invention will become apparent in the following more particular description of a preferred embodiment of the invention, as illustrated in the accompanying drawings, wherein.

Figure 1:
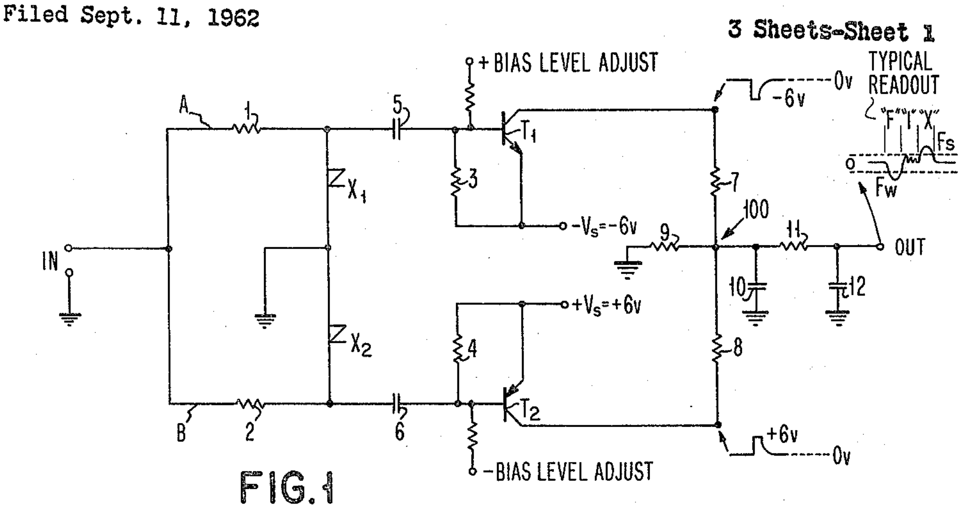
FIG. 1 is a schematic circuit of a practical embodiment of the invention.

In FIG. 1 there is shown a circuit which constitutes an identifying system according to this invention whereby speech may be identified according to voicing and frictional characteristics. Since these characteristics are distinguishable according to the density of the zero-axis-crossings produced when the acoustic wave is transduced, the detection task of this circuit becomes that of discriminating between axis-crossing density levels. Frictional sounds do not have the asymmetry characteristic, nor do they contain the appreciable components at the relatively low frequencies that characterize the voiced sounds. Instead, frictional sounds are relatively high frequency and noise-like in character, and their axis-crossing densities, which are much higher than those of voicing, may be used to identify frictional syllabification. Weak frictional sounds may be distinguished from strong in that they have a lower energy content although they may have as high, or even higher, an axis crossing density. A second task to be performed by the circuit is discriminating between signal amplitude above a minimum level of axis-crossing density. These two functions are performed in a uniquely simple and convenient manner by my novel arrangement of tunnel diodes in combination with associated switching means as a means for producing parallel lines of bucking voltages, the sum of which distinguishes weak and strong frictioning. The aptness of the Esaki diodes for this purpose is their bi-stable, resistance-hysteresis characteristics whereby they may be "tripped" at different levels of input signal current.

Figure 3:
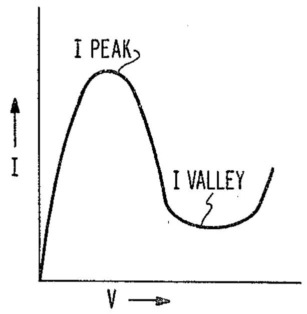
FIG. 3 is a curve representing the voltage-current characteristic for typical Esaki diodes such as those used in the invention.
Figure 4:
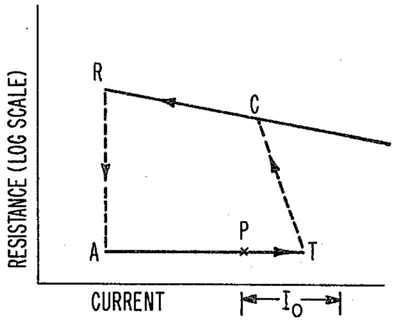
FIG. 4 is a curve representing the resistance-current characteristic for a typical Esaki diode.

The mechanism whereby an Esaki diode can receive an incoming signal and emit a pulse, or not, according to the current strength of the incoming signal is well known in the art and illustrated by the square resistance-hysteresis curve shown in FIG. 4. Being a highly doped PN junction semiconductor, the Esaki diode operates like a resistor having a negative resistance slope in the lower end of its current-voltage curve beginning at about 50 millivolts through about 200 millivolts. FIG. 3 shows this negative resistance slope in a typical-Esaki diode. The practical effect of this negative slope region is to establish a "transition region" for the Esaki along its current-resistance curve between the two stable resistance levels or plateaus. Thus, it is called a bi-stable resistance diode. Referring to the curve in FIG. 4, it will be noted that the lower resistance plateau (AT) extends up to about a few hundredths of a volt, at which point (T) transition occurs, the resistance rising quickly to many times its former value. Thereafter, it assumes the higher stable resistance condition (C–R) and maintains this until the current drops nearly to zero (R). This square-shaped closed-loop curve (ATCR), described and shown in FIG. 4 as representative of the change of resistance with throughput current, is the reason why an Esaki diode is characterized as having resistance-hysteresis characteristics.

To initiate the operation of the invention, a transduced acoustic wave is introduced into the system in FIG. 1 at the input terminal and thereafter sent down parallel detecting lines, the low amplitude detecting line A and the high amplitude detecting line B. The resistors 1 and 2 are adjusted so as to scale the "transition current" as necessary to trip the separate Esaki diodes. If resistor 1 is sufficient to pass ordinary low amplitude pulses and trigger diode $X_1$, then the other loading resistor 2 will be multiple of this resistance value so as to trigger $X_2$ when it receives a high amplitude pulse and so present roughly the same amount of transition current to diode $X2_1$ as to diode $X_1$. This allows the Esaki diodes X1 and X2 to "trigger" at different signal input current levels and yet have roughly the same characteristics. The same effects can be achieved by using scaling amplifiers in place of resistors 1 and 2. Alternatively, Esaki diodes X1 and X2 may be selected to inherently exhibit different triggering levels.

When low level input pulse triggers diode X1 causing it to assume its high resistance state, this causes a differentiated representation of the pulse to run down the R–C differentiating line from the potential terminal $V_s$ (−6 volts) to resistor 3 and capacitor 5. This positive-going pulse is fed to the base of NPN transistor T1, which in turn is caused to emit a negative pulse charge onto the integrating capacitor 10. In this fashion, a pulse charge will be placed on this readout capacitor 10, each time a "low level" input signal crosses the zero axis. The output wave from capacitor 10 will represent the integration of a large number of these pulses. Consequently, the small number of polarity reversals (or, analogously, the low density of zero-axis crossings) which are characteristic of "voicing", will produce relatively few coulombs of charge on the integrating capacitor 10 over a given period of time and can be made to produce a readout wave of negligible amplitude (zero output) by a suitable selection of impedance values.

In this manner a voicing signal may be separated from a frictional signal by simply adjusting the output level of the circuit and produce "no signal" as indication of voicing and "perceptible signal" (high density zero crossings) as an indication of frictional input.

In a similar manner, a high level of input current, corresponding to strong frictioning as opposed to weak frictioning, will trigger the high level diode X2 and thereafter, being R–C-differentiated by resistance 4 and capicitance 6, will induce a positive pulse output from transistor T2. The discrimination against "weak frictional or low signal current" signals is produced, as stated above, by scaling up resistance 2, for example to ten times resistance 1. Thus, any low signal current will be dropped off by resistance 2 and, of course, produce no output from transistor T2. Of course, due to its relatively high voltage level, a strong frictional input signal would also trigger the "A" detecting line in the manner of a weak frictional signal.

In the advent of strong friction, a current pulse output of negative polarity is produced at transistor T1 with strong frictional-high current signal producing bucking throughput pulses at capacitor 10. Lest these bucking pulses produce a null, as in the case of the voicing or low axis crossing density input, the output lines for each of the switching devices (here transistors T1 and T2) contain scaled impedances 7 and 8. Impedance 8 may suitably be a resistor of about one-half the magnitude of impedance 7. This means that when a strong frictional signal triggers both transistors, T1 and T2, the current from the T2 (or positive) side of the voltage source $V_s$ will predominate and produce a higher net charge (positive) at capacitor 10, since its charging path comprises a smaller impedance, 8. Node 100 is also connected to ground through resistor 9 so as to give a common reference to both transistor output lines. Resistor 9 is typically of lower resistance than 7 or 8. Resistor 11 and capacitor 12 have an R–C time constant approaching that of the typical rate of syllabication, that is, the rate of which syllables are successively enunciated. They operate as a smoothing filter to eliminate noise and other sporadic signals by smoothing out pulses of non-syllabic frequency.

Figure 5:
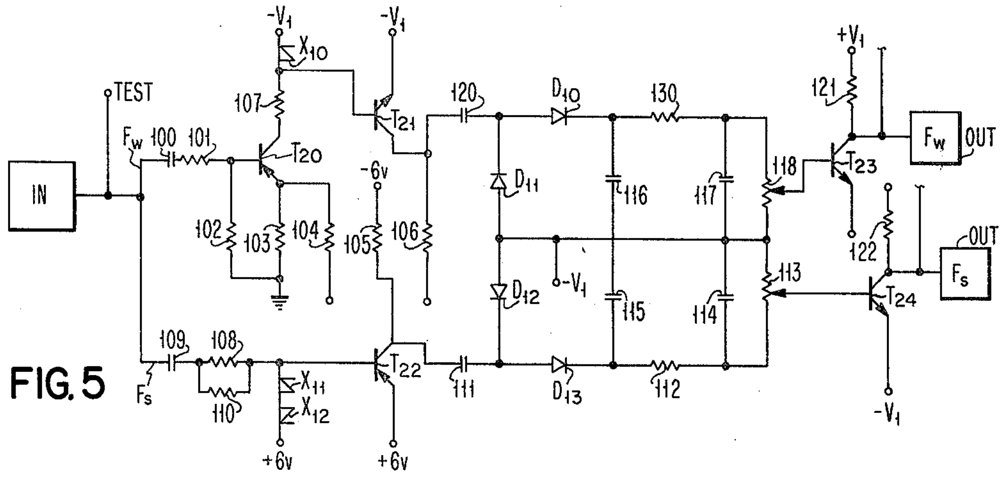
FIG. 5 is a schematic circuit of another embodiment of the invention in a system performing voicing detection, as well as friction detection.

The R–C differentiating circuits along lines A and B may, alternatively, comprise a different form of differentiating circuit namely the "bucket and well" type differentiator. This circuit is shown in FIG. 5 and operates as follows. The operation is initiated when transistor T22 sees a rectangular wave shape at its base from the tunnel diodes (X11, X12). Under quiescent conditions, the collector of T22 is at −6 volts. When T22 conducts in response to the signal input at its base, collector of T22 changes to essentially +6 volts and charges capacitor C111 via clamping diode D12. When the signal on the collector of T22 returns to quiescence, C111 "dumps" its charge into C115 which is of much larger capacitance than C111. Thus, the change expressed in voltage across C115 is increased slightly each time the charge on C111 is dumped into it. Resistor 112 and capacitor 114 smooth the charging pulse on C115 while potentiometer 113 provides a discharge circuit for C115 and C114. Consequently, the output voltage on potentiometer 113 represents the rate of charge pulses on C111 which, in turn, is the rate of tunnel diode switching, and this, in turn, is the axis density of the input wave shape. This differentiating means is merely one alternative to that shown in FIG. 1 and others may suit. Its characteristic operation will be more apparent upon consideration of the more detailed description of FIG. 5 below.

Figure 6:
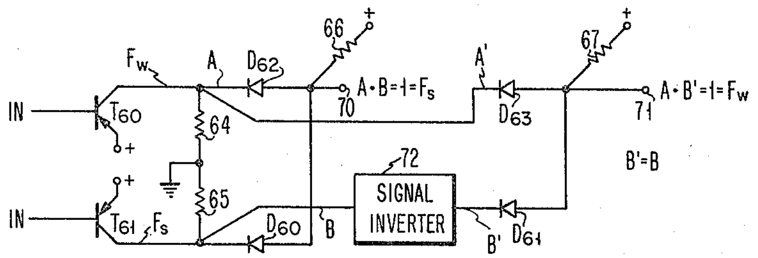
FIG. 6 is a circuit showing output AND logic for friction detection.

Returning to FIG. 1, the operation of the above described speech recognition circuit in FIG. 1 may be logically traced as follows. A "voicing" input signal at the "In" terminal will initiate relatively few output pulses from Esaki diodes X1 and X2 and, when differentiated by the RC circuits along lines A and B, will present relatively few tripping pulses to switching transistors T1 and T2. As a result, an effective null output-charge will appear upon integrating capacitor 10 because the circuit parameters have been preselected so as not to register this low level output signal characteristic of a voicing signal. However, when a frictional signal is placed upon the input terminal, since it has a relatively high zero-axis-crossing density, it will produce a high number of pulses on the switching transistors and a higher, significant charge at the output. It should be noted, however, that extremely careful design is necessary to perform this delicate axis-density measurement. Moreover, the frictional input signals will, in turn, be distinguished according to their amplitude, that is whether they are strong frictional or weak frictional sounds. This amplitude discrimination is accomplished by scaling the input impedance to the Esaki diodes so as to produce an output pulse on only one diode when the input is below a given input amplitude, namely, that of the strong frictional syllables. Hence, weak frictioning will produce an output pulse from switching transistor T1 only. However, on the onset of a strong frictional sound, both Esaki diodes will produce output pulses triggering both transistors T1 and T2 and producing a different net output charge on capacitor 10. Consequently, the output from this circuit may be one of three signals representative of three types of syllabication. As an illustration, the signals might be: 0 for voicing and noise, +1 for strong frictional and −1 for weak frictional sounds. Or, if it is preferred to read out according to an "AND" circuit, such a circuit may be inserted with its input at node 100, and register "AND" pulses upon strong frictioning to distinguish from weak friction. This is indicated in FIG. 6.

Turning now to the embodiment of the invention shown in FIG. 5, a general similarity may be noted between this figure and the embodiment shown in FIG. 1. The form of the circuit is more practical and complete than FIG. 1 and embodies some dual functioning components, useful for other purposes besides friction detection. The audio speech signal is presented at the IN terminal and, as before, the strong frictioning and weak frictioning are detected along parallel branches, $F_s$ and $F_w$. Trigger diodes X10 and X11–X12, as well as switching transistors T21 and T22, operate like those described in FIG. 1. Capacitors 100 and 109 serve phase distortion attenuator functions to distinguish V, F, and V–F from Noise signals in the manner of attenuator 301 in FIG. 8 (described below). These attenuator R–C circuits shape the signals (like those in FIG. 9) and comprise element 100 and 102, 109 and 108. The amplitude discrimination between $F_W$ and $F_s$ is accomplished by placing an amplifier transistor T20 in the $F_W$ line for detecting the weaker pulses. None is required in the $F_s$ line. This is a substitute for the scaled impedances shown in FIG. 1. Esaki diodes X11 and X12 are placed in back to back relation to prevent base line shift by presenting symmetrical loading to capacitor 109. Registration of the output signal from switching transistors T21 and T22 is accomplished in a different but analogous manner to that in FIG. 1. The registration components comprise capacitors 111 and 120, 115 and 116 in combination with diodes D10, D11, D12 and D13, one each of these pairs of components being symmetrically disposed along each of the two branch lines. The function of this arrangement is to dissipate small, non-friction output signals representative of insufficient pulse density to produce a measurable charge on the output capacitors 115 and 116 whose capacitances are roughly 100 times that of capacitors 120 and 111. The net effect of this is to yield no output charge for voicing frequencies (about 200 c.p.s.) and a positive signal for frictional frequencies (about 6,000 c.p.s.). RC smoothing circuits 112 and 114–119 and 117 follow the registration circuits and feed output potentiometers 118 and 113. For purposes of presenting a readout pulse of convenient magnitude, transistor amplifiers T23 and T24 present amplified pulses from the $F_W$ and $F_s$ branch lines to the output pulse registration terminals.

Figure 2:
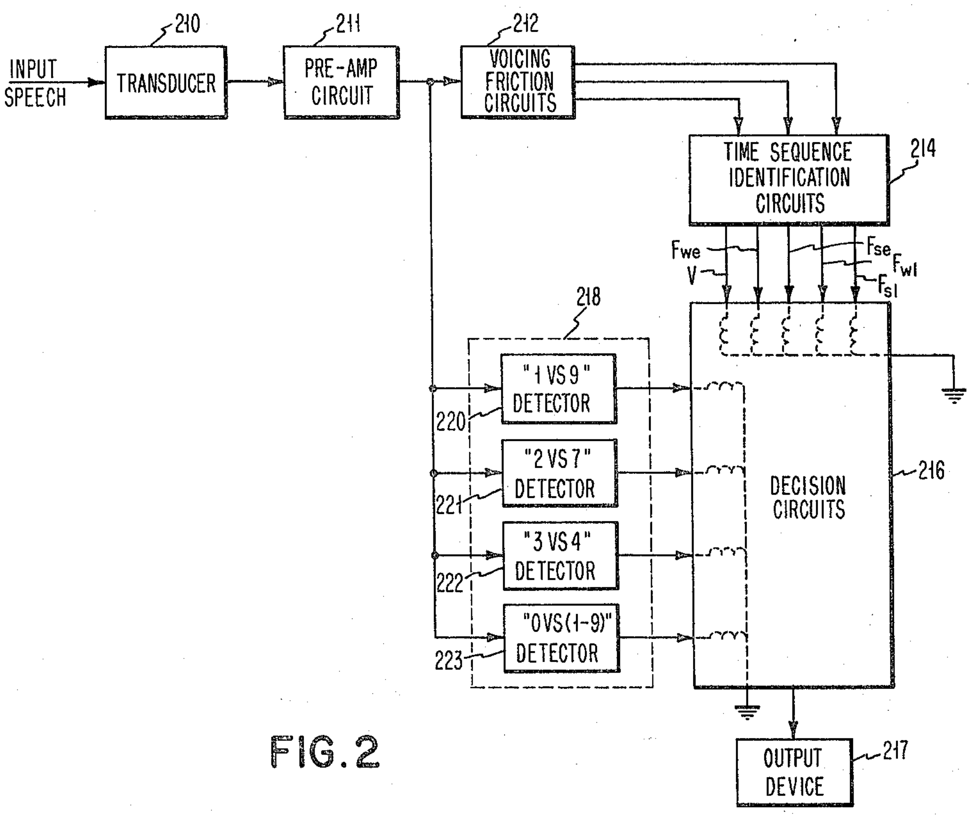
FIG. 2 is a block diagram showing a typical system wherein the invention has special applications.

A typical environmental system for employing the invention as described in FIG. 1 or FIG. 5 is shown in FIG. 2. This system operates in response to the electrical transduction of the acoustic waves generated when a speaker enunciates one of a set of preselected "code words." The signals themselves present all of the information needed to discriminate sounds and words spoken and are analyzed directly. The conversion means for the acoustic waves is a transducer 210 such as a microphone, but it will be recognized that other devices and systems which provide signals representative of speech with adequate fidelity may also be employed. The signals derived from the transducer 210 are amplified in preamplifier circuits 211 and thereafter applied to various property measurement circuits.

In this arrangement, voicing-friction circuits 212 operate in highly integrated fashion to provide independent indications of the occurrence of voicing, weak friction or strong friction sounds, these indications being correlated in the decision stage. The embodiment of the invention shown in FIG. 5 could be aptly employed for the Friction (and Not-Voicing) measurements. An alternative friction detector would be that shown in FIG. 1. From a consideration of FIG. 2 and FIG. 1, it will be appreciated that the inventive inter-combination of elements permits the performance of this complicated sectioning of the properties of words with as few as four active elements, namely, 2 diodes and 2 transistors.

The three different signal indications which are provided from the voicing and friction circuits 212 may occur an any sequence. These signals are arranged to include a time-base by the time sequence identification circuits 214 (the machine syllable technique) which modify the raw signals into time-related signals, known as friction weak early ($F_{we}$), friction strong early ($F_{se}$), friction weak late ($F_{wl}$) and friction strong late ($F_{sl}$) signals. The different signals provided from the time sequence identification circuits 214 energize relay coils (indicated in phantom only) in decision circuits 216 which control an output indicator 217. The decision circuits 216 may employ any suitable switching arrangements. Circuits 216 are also arranged to provide an analog signal for controlling the output of indicator 217. The decision circuits 216 are also controlled (sometimes overruled) by a group of passive vowel identification circuits 218, each of which energizes a relay coil in the decision circuits 216. These vowel identification circuits include specialized detectors like detector 220 which distinguishes the spoken "1" from the spoken "9" sound by providing a signal only when one or the other is present. This is hereafter referred to as the "1 vs. 9" detector 220. Similarly, there is a "2 vs. 7" detector 221, a "3 vs. 4" detector 222 and a "0 vs. (1–9)" detector 223. In this system, the orally expressed zero is represented by the commonly spoken "oh" sound.

To illustrate the operation of this system sequentially, let us assume that certain enunciated speech signals are presented in parallel to the voicing-friction circuits 212 and the passive vowel identification circuits 218.

The friction detector indicates the occurrence of frictioning and whether it is strong or weak. The voicing detector indicates voicing and the output logic compares these. (cf. FIG. 7). The time sequence identification circuits 214 give the time relationships of the various frictional sounds to voicing, while indications are concurrently provided of whether the specific vowel characteristics have occurred at 218. The decision circuits 216 distinguish these conditions without requiring the use of separate logic elements. The decision circuits 216 respond in terms of digital combinations of values, through signal switching techniques, together with analog values to provide unique output signal amplitudes for each code sound and this is indicated at the output 217. The output device 217 may, for simple applications, comprise a current meter having indicia on its face (coded values) arranged to indicate the words which have been spoken.

Figure 7:
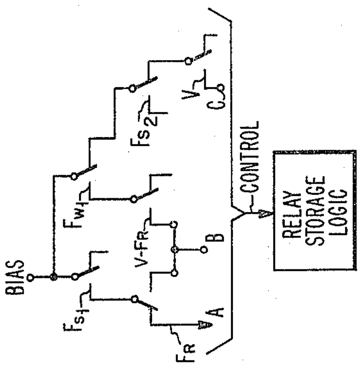
FIG. 7 shows a circuit having "OR" relay logic for segregating signals from the invention as embodied in FIGS. 1 and 5.

In the circuit shown in FIG. 7 there is shown an output device arranged to show how the frictioning detector of the instant invention may be employed advantageously for identifying "mixed syllables" as well as frictioning; that is, syllables having both Voicing and Frictioning, as for instance in the "Zee" sound. This circuit also illustrates the added advantage of using the frictioning detector for identifying the occurrence of Ambient Noise, if it is used in conjunction with a suitable voicing detector. Analysis of the relay logic employed here demonstrates how this dual objective is accomplished. The logic takes the form of a relay tree coupled to a positive source of bias and having output terinals A, B, and C. Six double-pole, single-thrown relay armatures are shown, these being controlled by the similarly designated relay coils (FIG. 2) which are in turn actuated from the time sequence identification circuits 14 of FIG. 1. The relay armatures here are called the strong frictioning switch $F_{s1}$, $F_{s2}$, the weak frictioning switch $F_{w1}$, the voicing switch V and the mixed voicing and frictioning switch V–$F_r$. The voicing switch V is connected in circuit with the other switches whenever voicing is found to be present as is the case with each of the spoken digits in the selected vocabulary of a number counting machine. An output signal at one of terminals A, B, or C serves, easily and simply, to indicate the occurrence of Frictioning, Voicing, Mixed Voicing and Frictioning or Ambient Noise. For example, a signal from the strong frictional detector would close switches $F_{s1}$ and $F_{s2}$ so as to indicate the occurrence of some kind of Frictioning. This would register only at terminal A, unless the signal were mixed with Voicing, as in the above mentioned example of the sound "Zee," in which case the relay at $F_r$ would be swung open into the V–$F_r$ position so as to produce an output at B, not A, to represent the Mixed sound. The bi-polar logic will similarly indicate Voicing alone as opposed to Voicing mixed with Frictioning. The logic may also detect Noise according to the non-energization of any relay (no positive identification of $F_r$, V or V–$F_r$) in conjunction with the reception of "some sound" at the transducer. Since this sound has been definitely (though negatively) identified as "Not $F_r$," "Not V," "Not V–$F_r$," it must be noise.

In FIG. 6 there is shown output logic for the friction detector similar to that shown in FIG. 7 but involving an "ANDing" arrangement of diodes rather than relays. This circuit can be best understood according to the following description of a typical operation.

In the instance of an output signal from transistor T60, indicative of the reception of an "$F_w$-present" signal, an output of voltage level 1 will be observed at terminal 71 due to the current increase through isolating diode D63 in response to the increase from T60 through load resistor 64. This same current output will also gate the diode D61 in response to the signal inversion performed by the inverter 72. The net effect is that the voltage through these isolating diodes is coincident at terminal 71 and non-coincident at terminal 70. Thus, according to Boolean Algebra notation, an $F_w$ signal causes signals "A" and "B′" (i.e., "not B") to occur. The occurrence of "A" and "B′" gives rise to a signal at terminal 71, indicating the occurrence of "$F_w$ only." Algebraically, $A \cdot B' = 1 \rightarrow F_w$, i.e., the occurrence of both signal "A" and signal "not B" indicates $F_w$ occurrence according to the "AND" operation. By contrast, an $F_s$ input causes signals "A" and "B" to produce an output at terminal 70 which indicates the occurrence of "$F_s$ only." Algebraically, $A \cdot B = 1 \rightarrow F_s$, i.e., the occurrence of both signal "A" and signal "B" indicates "$F_s$." Note that there is no "not B" ("$\bar{B}$") signal and thus there is no false indication of $F_w$ at terminal 71.

Thus, according to Boolean Algebra, a weak friction signal produces a signal "A" and a signal "$\bar{B}$" which means "not B." The presence of two signals, "A" and "not B", give rise to a signal at 71, meaning, "Yes, we have $F_w$ only." An $F_s$ input provides a signal "A" and signal "B," allowing a signal output at 70, indicating $F_s$ only. Note that there is no "not B" signal to prevent (correctly) a signal at 71.

The above means of producing a simple digital output signal representative of strong frictioning or weak frictioning is illustrative of the power inherent in the simple means of discriminating these two values according to the instant invention. The output logic illustrated is only exemplary, of course.

Figure 9:
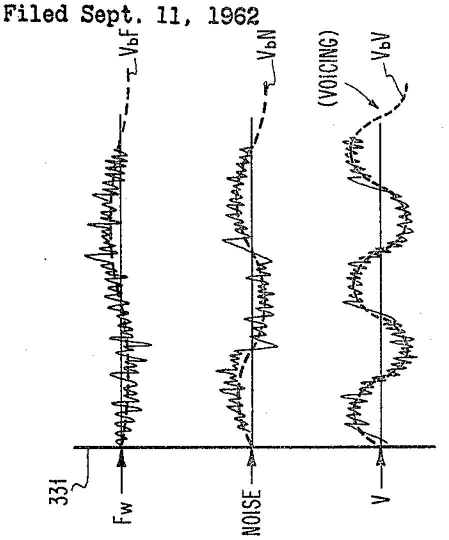
FIG. 9 shows the resultant output signals as analyzed from the system in FIG. 8.
Figure 8:
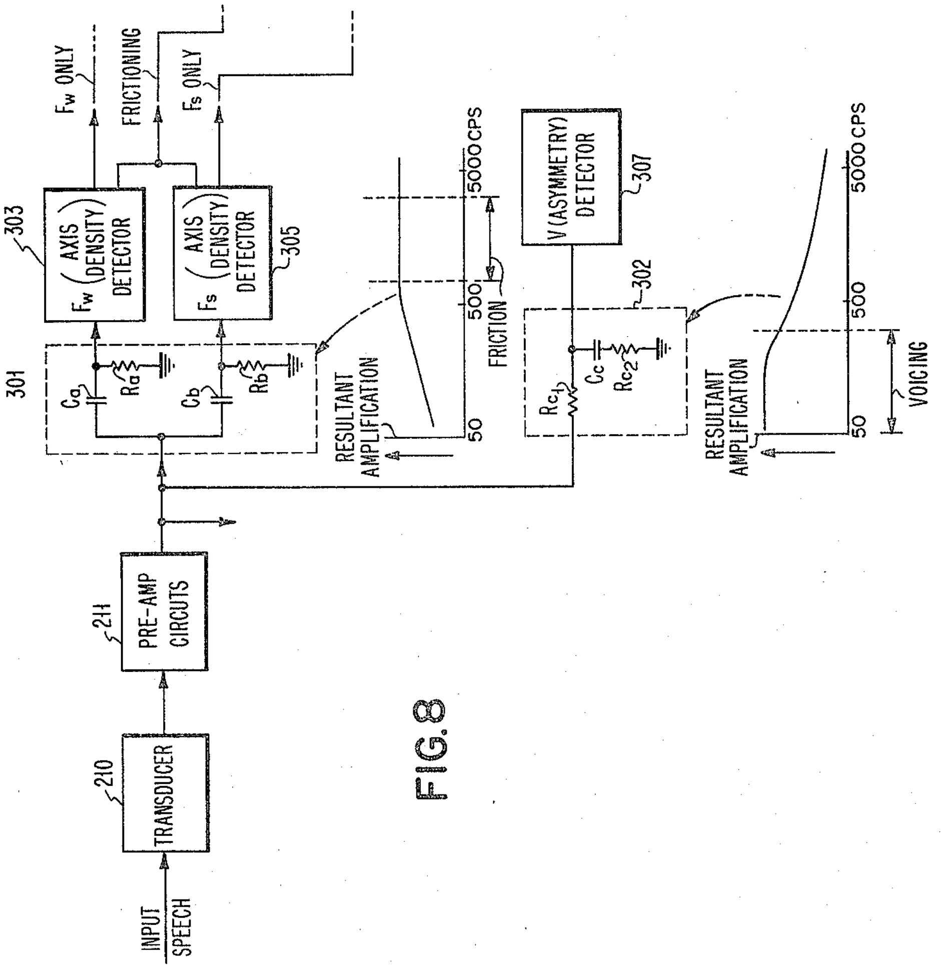
FIG. 8 shows a schematic circuit and block diagram of a system using the device in FIG. 1 with, in addition, an inventive combination of filters and voicing detectors.

The schematic circuit shown in FIG. 8 shows a novel Discriminating circuit which may be used in combination with the inventive Friction detector, described before, to enhance its accuracy. This Discriminating circuit comprises a pair of Attenuation circuits 301 and 302 in combination with the specially selected Microphone 210 and a non-drift base line Amplifier 211, both carefully matched to these circuits. These elements co-operate to reject noise from the detector units 303, 305 and 307 and aid in increasing the accuracy of the detectors. As is seen in the curve accompanying circuit 301, the C–R attenuators produce an effective amplification which markedly attenuates the low frequency components of the input wave but does not significantly effect the high frequency (viz, Friction) components. This is a very delicately balanced, quantitatively critical adjustment of impedances and care must be taken to match impedances exactly—however, the system is very stable once this is done. The object is to selectively attenuate only the low frequency, or verbal "Burble," component V*b*F of the frictioning wave as seen on the wave diagram 331 in FIG. 9. This wave attenuation results from the amplification characteristic of Attenuator 301 (cf. accompanying curve). The arrangement brings most, if not all, of the high frequency spikes riding on this low frequency component V*b*F close enough to the reference axis that they will cross it and produce registration on the axis density detectors 303, 305 and thus significantly indicate Frictioning. However, the quantitative limit to this attenuation is established by the magnitude of the low frequency burble $Vb_N$ in the typical noise wave as shown in graph 331, which differs from that of the frictioning mainly in its amplitude and hence should not be attenuated so severely that it, too, will be made to register significantly more axis crossings and so be confused on the axis density detectors with Frictioning. The attenuation performed by Attenuator 302 for the Voicing detector 307 (which measures wave asymmetry) is the converse of the above in that it selectively attenuates the *higher* frequencies which contain Noise and Friction sounds, and leaves the low frequency portion of the wave (containing the bulk of the Voicing components) relatively untouched. This is indicated on the Amplification characteristic of Attenuator circuit 302 (cf. accompanying curve). Since the parameter to be measured here is the asymmetry of the wave as an indicator of Voicing components, the discrimination over other components becomes better as the high frequency part of the input wave to Voicing detector 307 is attenuated, since this in turn accentuates the asymmetry of the wave there. FIG. 9 shows such an input wave at V (cf. low frequency voicing component). However, some Noise components also have a slightly asymmetrical character and should not be confused with Voicing. Therefore, the possibility of confusing Voicing with Noise-asymmetry is eliminated by attenuating the higher frequency spectrum in which Noise characteristically occurs and thus accentuate the lower-frequency voicing component. This is indicated by the curve accompanying circuit 302. As in the case of the C–R Attenuator 301 for frictioning, the R–C Attenuator 302 for voicing must be carefully matched with the impedances of the transducer 210 and amplifier 211.

It will be obvious that unless the amplifying means will maintain a constant base line or reference potential, the carefully controlled attenuation described above will be ineffective. Hence, one must be very careful to choose amplifying means 211 so that it exhibits an unshifting base-line. Most high quality D.C. amplifiers and some A.C.-coupled amplifiers are suitable for this, but the generally available commercial amplifiers have been found unsatisfactory. It is also important to choose a microphone transducer 210 which is compatible with the attenuator circuits. Most commercially available microphones have a frequency response which is entirely too random to be used for the careful detection required. Hence, in the aforegoing discussion of the attenuator circuits 301 and 302, it was presumed that the microphone had a constant frequency response. Such a microphone might make it unnecessary to use the attenuator means, as for instance, the attenuator circuit 302 for the asymmetry detector. But this would be a somewhat mythological microphone in its high quality and thus, one emphasizes that the attenuator circuits must be most carefully matched with the frequency response of the microphone. If, for instance, the response is not flat in the chosen spectrum, but is increasingly poor going from low to high frequencies, it may well be that the attenuator circuits 301 and 302 would have to be interchanged for the necessary resultant attenuation. I have achieved reasonable success using a dynamic moving-coil microphone such as the Electro-Voice Model #664 with the mid-range port closed off. An added advantage to this attenuator arrangement is that the time constant for the microphone-amplifier unit can be balanced for a particular predictable kind of room noise by impedance-balancing the Frictioning impedances, thus enhancing the Noise discrimination.

The attenuator system described above is relatively delicate to balance, but once the proper balance is found, the machine is able to so perfectly discriminate against Noise and identify speech in the presence of noise that I have been able to operate it in environments having so high a noise level as to be tiring to the human observer. I have used this system in varied circumstances of high Noise and found that once the proper balance is achieved, it will continue to reject Noise and register speech with no apparent difficulty. The system has demonstrated this in such high noise environments as convention assembly rooms, a fair midway and in the midst of typewriter clatter in offices. The wide utility of such a speech recognition device in these noisy atmospheres, such as conventions, operators in street traffic or noisy aircraft, etc., is obvious. This advantage constitutes a marked improvement over the prior art wherein any attempt to use axis density crossings required the use of a soundproof room for operational efficiency.

Figure 10:
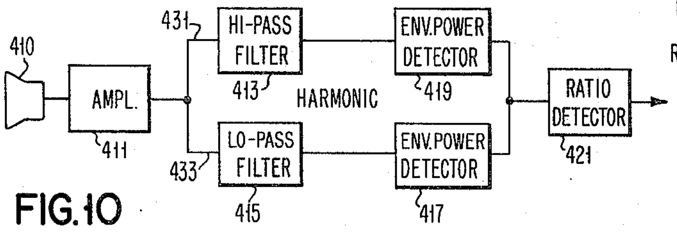
FIG. 10 shows a representative prior art voicing-friction detection system.
Figure 11:
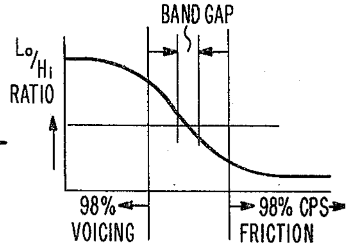
FIG. 11 shows the distribution of identifiable signals in the vocal frequency spectrum, using the method of FIG. 10.

The merits of the instant combination over the prior art are best displayed by considering the performance of a typical prior art voicing-friction detector such as that shown in FIG. 10. In this figure, the speech input at microphone 410 is amplified by amplifier 411 and presented in parallel to a friction detector line 431 and a voicing detector line 433, so that thereafter the percentages or ratios of each component, voicing and frictioning, can be measured by a ratio detector 421. The detection of the separate components is accomplised by envelope-power detector means, such as 419 and 417. This method is called the Band Ratio detection technique. It is commonly used and operates on a harmonic, or complementary, mensuration principle where the presence of one parameter is used as an indication of the absence of the other. They are not measured independently or separately identified as in my invention. The envelope power detectors work in tandem with filters 413 and 415 which pass only the dominant frequencies of the appropriate speech component. Thus, the identification will take the form of a code number (the given ratio) to represent either voicing or friction. This number is represented in the curve in FIG. 11 which plots characteristic frequency distribution of the envelope power ratios. But the drawbacks in this "dependent-measurement" technique are several. For instance, low frequency power alone or high frequency power alone are readily detected and this, in turn, would roughly represent the presence of voicing *alone* or friction *alone* according to a given ratio greater than or less than one, respectively. But this mutually dependent measurement technique establishing the presence of voicing by the absence of frictioning and vice versa renders it useless for distinguishing mixed voicing and frictioning, a necessary piece of information. Further, it cannot separate this state from the presence of noise. This is evident from the curve in FIG. 11 where it is noted that as the ratio approaches the value of one, the operator knows only that it is probable that voicing alone and frictioning alone are not present but is unable to tell whether the signal in this area represents mixed voicing-friction signal, mere noise, or an error. The system has the further problem of operating in the band where the frequency response is at its poorest. As a case in point, it has been observed that when the noise-to-signal ratio is greater than 20:1, prior art devices according to this method become virtually insensitive and useless. By contrast, my system operates effectively in the 1:20 signal-to-noise environment, and has been found satisfactory in an environment where the noise was so high that the observer was himself unable to understand the subject speaker without considerable difficulty and irritation. It is important to note that, as opposed to the prior art, the instant invention accomplishes its voicing and frictioning measurements independently of each other and in a non-harmonic manner, in contrast with the harmonic, or mutually dependent methods of the prior art as represented by the "Band Ratio" method in FIG. 10. This does not only means that voicing alone and frictioning alone are detected better than the prior art, since independent indication of $No-F_r$ or $No-V$ may be had, but also that two additional parameters of practical significance in speech detection, namely, mixed voicing-friction and noise per se, are usefully detected where the prior art has failed.

While particular embodiments described above represent useful applications of the inventive wave analyzing system for speech recognition purposes, such usage does not exhaust its wide potential. In the broad sense, the inventive combination is a means for recognizing and discriminating between wave forms according to their zero-axis-crossing density characteristics, as well as their relative amplitude. Such a capability is advantageous in a multiplicity of wave analyzing and pattern recognition contexts. Examples of such usage would be frequency to voltage conversion; digital to analog conversion; demodulation of an FM modulated wave (change in signal frequency with reference to a standard frequency) and plotting of continuous curves from digital data such as in the output terminals of data processing system.

While there have been described above and shown in the drawings, various systems and methods for analyzing wave forms and thereby recognizing spoken syllables in accordance with the invention, it is apparent that various elements and steps may be modified or completely supplanted by the use or substitution of other known elements or arrangements of components. Accordingly, the invention should be considered to include all modifications, variations and alternative forms falling within the scope of the appended claims.

I claim:

1. In a system for analyzing waves according to polarity-reversal densities, the combination including a first tunnel diode,
a second tunnel diode in parallel with said first diode,
a voltage source,
a first transistor connected to one pole of said voltage source,
a second transistor connected to the other pole of said voltage source,
a wave input terminal,
a first load line connecting said terminal with the base of said first transistor and the input point of said first diode,
a second load line connecting said terminal with the base of said second transistor and the input point of said second diode,
a first impedance between said terminal and said first diode in said first line,
a second impedance disposed in said second line between said terminal and said second diode, the resistance of said second impedance being about one order of magnitude higher than said first impedance, and an output terminal including means connecting said transistors thereto.

2. The combination as recited in claim 1 wherein said output connecting means includes:

a charging capacitor across which the output pulse may be read out, smoothing filter means of syllabification frequency, and an isolating impedance connected betwen said capacitor and a reference potential.

3. The combination as recited in claim 1 wherein there is, additionally:

an output impedance for each of said transistors, the impedance value of one being about ten times that of the other, so as to render their output pulses easily distinguishable.

4. The combination as recited in claim 1 wherein said lines include, each:

an R-C differentiating circuit between each of said diodes and the transistor connected thereto.

5. A wave analyzing system for axis-crossing density analysis comprising:

an input terminal, a first bi-level impedance, a first load resistor connected between said first impedance and said terminal, a second bi-level impedance, a reference potential connected between said first and second impedances, a second load resistor connected between said second impedance and said terminal and of about ten times the impedance value of said first resistor, a voltage source, a readout means, a first switching means connected between one pole of said voltage source and said readout means, the input of which is connected to the junction between said first impedance and said first resistor, a second switching means connecting the opposite of pole of said voltage source and said readout means, the input of which is connected to the junction between said second resistor and said second impedance, and a pair of differentiating means, one connected between each of said impedances and its associated one of said switching means.

6. The combination as recited in claim 5 wherein said impedances comprise:

Esaki diodes having substantially identical resistance-current characteristics.

7. The combination as recited in claim 6 wherein said load resistors comprise:

amplifier means so arranged as to amplify the input signals to the bi-level impedance means and whose amplification factors differ by one order of magnitude so that the said impedance means may discriminately be triggered by different input signals, differing by about one order of magnitude.

8. The combination as recited in claim 5 wherein said switching means comprises:

transistors having suitable conductances and arranged with opposing polarities.

9. The combination as recited in claim 8 wherein said readout means includes:

a ground terminal, an isolating impedance between said ground terminal and a junction point between said transistors, an output terminal charge integrating capacitor means connected between said output terminal and said ground terminal, and a pair of connecting means joining said ground terminal and said transistors.

10. The combination as recited in claim 9 wherein said readout means additionally includes:

filter means connected between said output terminal and said capacitor means, the time constant of which is selected so as to pass signals of an approximately syllabic rate, masking out other signal and noise frequencies.

11. The combination as recited in claim 9 wherein said readout line includes, additionally:

a first scaling resistor inserted between said ground terminal and said first transistor, and a second scaling resistor inserted between said ground terminal and said second switching transistor and having a resistance which is about ten times the resistance of said first scaling resistor.

12. The combination as recited in claim 9 wherein said readout means includes:

"AND" switching means so as to register the concurrence of signals, from both of said switching means.

13. The combination as recited in claim 5 wherein each of said differentiating means comprises:

an R–C circuit adapted so as to yield a pulse for each change of state of the bi-level impedance means associated therewith and connected so as to transfer this pulse to trigger the one of said switching means associated with it.

14. The combination as recited in claim 5 wherein said differentiating means comprises:

capacitive means in series with backward diode means.

15. A zero-crossing wave analyzer comprising:

an input terminal, an output line, low amplitude high zero-crossing density detector means connected between said terminal and said output line, and high amplitude high zero-crossing density detector means connector in parallel with said first low amplitude detector means, said low amplitude detector means and said high amplitude detector means adapted to provide a first output if neither is actuated, a second output if only said low amplitude detector means is actuated, and a third output if both said low amplitude detector means and said high amplitude detector means are actuated.

16. A zero-crossing wave analyzer comprising:

an input terminal;

an output line;

low amplitude, high zero-crossing density detector means connected between said terminal and said output line, said low amplitude detector means comprising:

a first tunnel diode;

a first switching means, serially connected, and a first differentiating means connecting them; and high amplitude, high zero-crossing density detector means connected in parallel with said first low amplitude detector means, said high amplitude detector means comprising:

a second tunnel diode, selected to exhibit one-tenth the transition current of said first diode;

a second switching means, and a second differentiating means connecting them.

17. In a method for recognizing speech signals, wherein frictioning and voicing sounds are transduced into distinct electrical signals and thereafter identified, the steps including:

detecting any pulse of said speech signals which reaches a first amplitude;

gating said detected pulses of said first amplitude in response to said detection;

differentiating said detected pulses of said first amplitude;

detecting any negative pulse of said speech signals which reaches a second amplitude different than said first amplitude;

gating said detected negative pulses of said second amplitude in response to said detection;

differentiating said detected negative pulses of said second amplitude;

adding said first differentiated signal and said second differentiated signal to provide a net signal;

integrating said net signal; and sensing the presence or absence, as well as the polarity, of the integrated net signal as an indication of the occurrence of voicing, weak frictioning or strong frictioning sounds.

18. The method as described in claim 17 wherein the sensing step includes, additionally:

the preliminary step of filtering said output signals so as to pass only "syllabic" frequencies, automatically eliminating any noise-generated signals.

19. A method of wave analysis whereby the axis-crossing densities of successive input waves are to be detected to thereby identify the characteristics of the wave, including the steps of:

detecting any signal of said input wave which reaches a first amplitude;

detecting any signal of said input wave which reaches a second amplitude different than said first amplitude;

gating said first detected signals of said first amplitude in response to said detection;

gating said second detected signals of said second amplitude in response to said detection;

subtracting said first gated signal from said second gated signal to provide a net signal; and registering the polarity of the net signal as an indication of the amplitude of said input signal to thereby distinguish said wave characteristics.

References Cited by the Examiner

UNITED STATES PATENTS

| | | | |
|---|---|---|---|
| 3,013,162 | 12/1961 | Antista | 307—88.5 |
| 3,054,071 | 9/1962 | Tieman | 307—88.5 |
| 3,096,449 | 7/1963 | Stucki | 307—88.5 |

ROBERT H. ROSE, *Primary Examiner.*

WILLIAM C. COOPER, *Examiner.*